United States Patent
Kawasaki et al.

(10) Patent No.: US 9,796,890 B2
(45) Date of Patent: Oct. 24, 2017

(54) MODIFIED ACRYLIC BLOCK COPOLYMER, METHOD FOR PRODUCING SAME, AND INTENDED USE OF SAME

(71) Applicant: KURARAY CO., LTD., Kurashiki-shi (JP)

(72) Inventors: Masahiro Kawasaki, Tainai (JP); Isamu Okamoto, Tainai (JP); Eiji Nakamura, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 0 days.

(21) Appl. No.: 14/915,526

(22) PCT Filed: Aug. 29, 2014

(86) PCT No.: PCT/JP2014/072823
§ 371 (c)(1),
(2) Date: Feb. 29, 2016

(87) PCT Pub. No.: WO2015/030207
PCT Pub. Date: Mar. 5, 2015

(65) Prior Publication Data
US 2016/0208149 A1 Jul. 21, 2016

(30) Foreign Application Priority Data

Aug. 30, 2013 (JP) .................. 2013-180728
Feb. 28, 2014 (JP) .................. 2014-039909

(51) Int. Cl.
C08F 293/00 (2006.01)
C09J 153/00 (2006.01)
C08F 8/32 (2006.01)
C09J 133/24 (2006.01)
C09J 133/26 (2006.01)

(52) U.S. Cl.
CPC .......... C09J 153/005 (2013.01); C08F 8/32 (2013.01); C08F 293/00 (2013.01); C09J 133/24 (2013.01); C09J 133/26 (2013.01)

(58) Field of Classification Search
CPC ......... C08F 293/00; C08F 8/32; C09J 133/24; C09J 133/26; C09J 153/005
See application file for complete search history.

(56) References Cited

U.S. PATENT DOCUMENTS

| | | | | |
|---|---|---|---|---|
| 5,110,877 | A * | 5/1992 | Hoess | C08F 8/48 525/329.5 |
| 6,734,256 | B1 * | 5/2004 | Everaerts | C08F 293/00 524/187 |
| 2003/0190467 | A1 | 10/2003 | Husemann et al. | |
| 2006/0052545 | A1 | 3/2006 | Guerret et al. | |
| 2010/0081754 | A1 | 4/2010 | Ma | |
| 2014/0045995 | A1 | 2/2014 | Shimamoto et al. | |

FOREIGN PATENT DOCUMENTS

| | | |
|---|---|---|
| JP | 2004-505164 A | 2/2004 |
| JP | 2006-500433 A | 1/2006 |
| JP | 2006-265461 A | 10/2006 |
| WO | WO 2012/114718 A1 | 8/2012 |

OTHER PUBLICATIONS

Phan, T.N.T. et al. published in Macromolecules vol. 40 pp. 4516-4523 (Jun. 2007).*
Schierholz, K. et al. Macromolecules vol. 36 pp. 5995-5999 (Jul. 2003).*
International Search Report dated Sep. 30, 2014 in PCT/JP2014/072823.
Supplementary European Search Report dated Feb. 13, 2017.

* cited by examiner

Primary Examiner — Irina S Zemel
Assistant Examiner — Jeffrey Lenihan
(74) Attorney, Agent, or Firm — Oblon, McClelland, Maier & Neustadt, L.L.P.

(57) ABSTRACT

A modified acrylic block copolymer is obtained by a method comprising subjecting a block copolymer (C) to a reaction with an amine compound, wherein the block copolymer comprises a polymer block (A) comprising a (meth)acrylic acid ester unit (a) and a polymer block (B') comprising a (meth)acrylic acid ester unit (b'), the (meth)acrylic acid ester unit (a) is structurally different from the (meth)acrylic acid ester unit (b'), thereby partly or entirely converting the (meth)acrylic acid ester unit (b') into at least one selected from the group consisting of an N-substituted (meth)acrylamide unit (d), a (meth)acrylic acid unit (c), and an N-substituted bis((meth)acryl)amide unit (e).

17 Claims, No Drawings

MODIFIED ACRYLIC BLOCK COPOLYMER, METHOD FOR PRODUCING SAME, AND INTENDED USE OF SAME

TECHNICAL FIELD

The present invention relates to a modified acrylic block copolymer, and a method for producing the same and use of the same. More specifically, the present invention relates to a modified acrylic block copolymer being high in the temperature (Tα) at which the loss elastic modulus rapidly decreases, a method for producing the modified acrylic block copolymer, and an acrylic adhesive and an adhesive product that are excellent in heat resistance, tackiness, and forming processability.

BACKGROUND ART

Block copolymers have the characteristics of each of their constituent polymer blocks, act accordingly, and are useful in adhesion bonds, polymer surfactants, thermoplastic elastomers, and the like. For example, a block copolymer comprising a methacrylic acid ester polymer block and an acrylic acid ester polymer block is known (Patent Document 1). This block copolymer is excellent in forming processability, transparency, weather resistance and the like and is therefore used in electronic members, industrial members, components of daily necessities, and the like.

Acrylic adhesives are superior to rubber-based adhesives in weather resistance and heat resistance, and are therefore used in adhesive tapes, adhesive sheets, for example. As base polymers for the acrylic adhesive, acrylic random copolymers and acrylic block copolymers are known.

As the acrylic block copolymers, Patent Document 3 discloses a block copolymer comprising a polymer block comprising a methacrylic acid alkyl ester and a polymer block comprising an acrylic acid alkyl ester, as a base polymer for a pressure sensitive adhesive. Patent Document 4 discloses a block copolymer comprising a polymer block mainly composed of a methacrylic acid alkyl ester and having a glass transition temperature of not less than +110° C. and a syndiotacticity of not less than 70% and a polymer block mainly composed of an acrylic acid alkyl ester and/or a methacrylic acid alkyl ester and having a glass transition temperature of not more than +30° C., as a base polymer for a hot-melt adhesive.

CITATION LIST

Patent Literatures

Patent Document 1: JP H11-335432 A
Patent Document 2: JP S60-210606 A
Patent Document 3: JP H02-103277 A
Patent Document 4: JP H11-302617 A

Non-Patent Literatures

Non-Patent Document 1: J. Applied Polymer Sci., 76, 1876, 2000

SUMMARY OF THE INVENTION

Problems to be Resolved by the Invention

The block copolymer disclosed in Patent Document 1 is poor in heat resistance, miscibility with other resins and the like, and therefore its applications are limited. As a technique to improve the heat resistance of methacrylic resin while preserving its transparency, Patent Document 2 discloses a method for producing a methacrylimide-containing polymer, the method comprising subjecting a methacrylic resin and a substance represented by $R-NH_2$ to a reaction in the presence of a non-polymerizable solvent at a temperature of not less than 100° C. and less than 350° C., and separation removing a volatile substance from the resulting reaction product. The resin obtained by this method, however, is poor in plasticity.

An object of the present invention is to provide a modified acrylic block copolymer being high in the temperature (Tα) at which the loss elastic modulus rapidly decreases.

An adhesive agent comprising an acrylic block copolymer as a base polymer has a phase-separated structure that is formed of a polymer block having a high glass transition temperature and a polymer block having a low glass transition temperature. The polymer block having a high glass transition temperature serves as a physical crosslinking site and gives cohesion force. In the adhesive agent comprising the acrylic block copolymer as a base polymer, however, the crosslinking site may be melted under high-temperature conditions, failing to give adequate cohesion force, which, for instance, may result in cohesive failure, leaving residual adhesive on the adherend.

Another object of the present invention is to provide an acrylic adhesive and an adhesive product that are excellent in heat resistance, tackiness, and forming processability.

Means for Solving the Problems

Intensive research has been conducted to achieve these objects and, as a result, the present invention having the following embodiments has now been completed.

[1] A modified acrylic block copolymer, comprising:
a polymer block (A) comprising a (meth)acrylic acid ester unit (a), and
a polymer block (B) comprising an N-substituted (meth)acrylamide unit (d),
wherein a ratio (Mw/Mn) of a weight average molecular weight (Mw) to a number average molecular weight (Mn) is 1.0 to 1.5.

[2] The modified acrylic block copolymer according to [1], wherein the (meth)acrylic acid ester unit (a) is an alkyl (meth)acrylate unit that is not a methyl (meth)acrylate unit.

[3] The modified acrylic block copolymer according to [1] or [2], wherein the polymer block (B) further comprises a (meth)acrylic acid ester unit (b) and/or a (meth)acrylic acid unit (c), and the (meth)acrylic acid ester unit (b) is structurally different from the (meth)acrylic acid ester unit (a).

[4] The modified acrylic block copolymer according to [3], wherein the (meth)acrylic acid ester unit (b) is a methyl (meth)acrylate unit.

[5] The modified acrylic block copolymer according to [3] or [4], the polymer block (B) satisfying the following relationships:

$$5 < ([d]+[c]) < 90; \text{ and}$$

$$0.01 < [d]/[c] < 0.075 \times ([d]+[c]) + 4,$$

wherein the [d] is a molar amount of the N-substituted (meth)acrylamide unit (d) relative to 100 mol of total molar amount of units constituting the polymer block (B), and the [c] is a molar amount of the (meth)acrylic acid unit (c) relative to 100 mol of total molar amount of units constituting the polymer block (B).

[6] The modified acrylic block copolymer according to any one of [1] to [5], wherein the N-substituted (meth)acrylamide unit (d) is a unit represented by Formula (Ia) or (Ib):

[Formula 1]

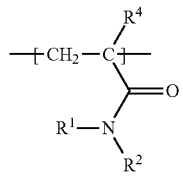
(Ia)

[Formula 2]

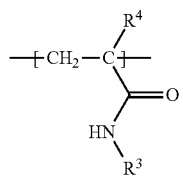
(Ib)

in Formulae (Ia) and (Ib), each of $R^1$, $R^2$ and $R^3$ independently represents an alkyl group optionally having a substituent, a silyl group, an amino group optionally having a substituent, a silanyl group, an alicyclic group optionally having a substituent, a heterocyclic group optionally having a substituent, or an aromatic ring group optionally having a substituent, $R^1$ and $R^2$ together with the nitrogen atom to which they are bound optionally form a ring, and each $R^4$ independently represents a hydrogen atom or a methyl group.

[7] The modified acrylic block copolymer according to any one of [1] to [6], wherein the polymer block (B) further comprises an N-substituted bis((meth)acryl)amide unit (e).

[8] The modified acrylic block copolymer according to [7], wherein the N-substituted bis((meth)acryl)amide unit (e) is a unit represented by Formula (II):

[Formula 3]

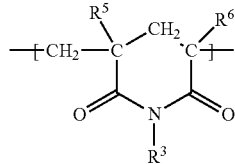
(II)

in Formula (II), each $R^3$ independently represents an alkyl group optionally having a substituent, a silyl group, an amino group optionally having a substituent, a silanyl group, an alicyclic group optionally having a substituent, a heterocyclic group optionally having a substituent, or an aromatic ring group optionally having a substituent, and each of $R^5$ and $R^6$ independently represents a hydrogen atom or a methyl group.

[9] A method for producing a modified acrylic block copolymer, the method comprising
subjecting a block copolymer (C) to a reaction in the presence of an amine compound, wherein the block copolymer (C) comprises a polymer block (A) comprising a (meth)acrylic acid ester unit (a) and a polymer block (B') comprising a (meth)acrylic acid ester unit (b'), the (meth) acrylic acid ester unit (a) is structurally different from the (meth)acrylic acid ester unit (b'), thereby partly or entirely converting the (meth)acrylic acid ester unit (b') into at least one selected from the group consisting of an N-substituted (meth)acrylamide unit (d), a (meth)acrylic acid unit (c), and an N-substituted bis((meth)acryl)amide unit (e).

[10] The method for producing a modified acrylic block copolymer according to [9], wherein the converting is performed by controlling a temperature of a mixture of the block copolymer (C) and the amine compound to be not less than a softening point of the block copolymer (C).

[11] The method for producing a modified acrylic block copolymer according to [9] or [10], wherein the amine compound is a primary amine or a secondary amine.

[12] The method for producing a modified acrylic block copolymer according to [9] or [10], wherein the amine compound is a primary amine represented by Formula (1) or a secondary amine represented by Formula (2):

[Formula 4]

(1)

[Formula 5]

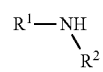
(2)

in Formulae (1) and (2), each of $R^1$, $R^2$ and $R^3$ independently represents an alkyl group optionally having a substituent, a silyl group, an amino group optionally having a substituent, a silanyl group, an alicyclic group optionally having a substituent, a heterocyclic group optionally having a substituent, or an aromatic ring group optionally having a substituent, and $R^1$ and $R^2$ together with the nitrogen atom to which they are bound optionally form a ring.

[13] The method for producing a modified acrylic block copolymer according to any one of [9] to [12], wherein the (meth)acrylic acid ester unit (a) is an alkyl (meth)acrylate unit that is not a methyl (meth)acrylate unit.

[14] The method for producing a modified acrylic block copolymer according to any one of [9] to [13], wherein the (meth)acrylic acid ester unit (b') is a methyl (meth)acrylate unit.

[15] The method for producing a modified acrylic block copolymer according to any one of [9] to [14], wherein a molar amount of the amine compound used in the reaction is 2 mol to 100 mol relative to 100 mol of the (meth)acrylic acid ester unit (b').

[16] An acrylic adhesive comprising the modified acrylic block copolymer according to any one of [1] to [8].

[17] The acrylic adhesive according to [16], further comprising a tackifier resin in an amount of not less than 1 part by mass and not more than 400 parts by mass relative to 100 parts by mass of the modified acrylic block copolymer.

[18] The acrylic adhesive according to [16] or [17], further comprising a plasticizer in an amount of not less than 1 part by mass and not more than 400 parts by mass relative to 100 parts by mass of the modified acrylic block copolymer.

[19] An adhesive product comprising an adhesive layer comprising the acrylic adhesive according to anyone of [16] to [18].

Advantageous Effects of the Invention

The modified acrylic block copolymer according to the present invention is high in the temperature (Tα) at which the loss elastic modulus rapidly decreases, the modified acrylic block copolymer according to the present invention has excellent heat resistance in addition to, for example, excellent forming processability, excellent transparency, and excellent weather resistance. The modified acrylic block copolymer according to the present invention can be used in electronic members, industrial members, components of daily necessities, and the like.

The acrylic adhesive and the adhesive product according to the present invention have excellent heat resistance and excellent tackiness. The reason why this effect is obtained is considered to be that the temperature (Tα) at which the loss elastic modulus rapidly decreases is higher in the modified acrylic block copolymer used in the present invention than in a conventional acrylic block copolymer. According to the present invention, excellent tackifying performance that lasts for an extended period of time can be obtained even in an environment with ultraviolet exposure or an environment with high temperature and high humidity.

EMBODIMENTS FOR CARRYING OUT THE INVENTION

The modified acrylic block copolymer according to the present invention comprises a polymer block (A) and a polymer block (B).

The polymer block (A) comprises a (meth)acrylic acid ester unit (a). The (meth)acrylic acid ester unit (a) is a unit formed by an additive polymerization of a (meth)acrylic acid ester. Examples of the (meth)acrylic acid ester can include alkyl acrylate esters such as methyl acrylate, ethyl acrylate, n-propyl acrylate, isopropyl acrylate, n-butyl acrylate, isobutyl acrylate, t-butyl acrylate, s-butyl acrylate, 2-ethylhexyl acrylate or the like; cycloalkyl acrylate esters such as cyclohexyl acrylate, isobornyl acrylate or the like; aryl acrylate esters such as phenyl acrylate or the like; aralkyl acrylate esters such as benzyl acrylate or the like; glycidyl acrylate, allyl acrylate, 2-methoxyethyl acrylate, 3-methoxybutyl acrylate, trimethoxysilylpropyl acrylate, trifluoroethyl acrylate, trimethylsilyl acrylate, and the like; alkyl methacrylate esters such as methyl methacrylate, ethyl methacrylate, n-propyl methacrylate, isopropyl methacrylate, n-butyl methacrylate, isobutyl methacrylate, t-butyl methacrylate, 2-ethylhexyl methacrylate, lauryl methacrylate or the like; cycloalkyl methacrylate esters such as cyclohexyl methacrylate, isobornyl methacrylate or the like; aryl methacrylate esters such as phenyl methacrylate or the like; aralkyl methacrylate esters such as benzyl methacrylate or the like; glycidyl methacrylate; allyl methacrylate; trimethylsilyl methacrylate; trimethoxysilylpropyl methacrylate, and the like. These can be used alone or with a combination of two or more.

Among these, as the (meth)acrylic acid ester unit (a), an alkyl (meth)acrylate unit that is not a methyl (meth)acrylate unit is preferable, and ethyl (meth)acrylate, n-butyl (meth)acrylate, and 2-ethylhexyl (meth)acrylate are more preferable. The amount of the (meth)acrylic acid ester unit (a) in the polymer block (A) is preferably not less than 95 mol %, and more preferably not less than 99 mol %.

The polymer block (A) may comprise a monomer unit in addition to the (meth)acrylic acid ester unit (a), examples of the monomer unit can include an aromatic vinyl unit such as styrene or the like, an α-olefin unit such as ethylene, propylene or the like, a conjugated diene unit such as butadiene, isoprene or the like, and the like.

The number average molecular weight of the polymer block (A) is not particularly limited, but is preferably 500 to 500000.

The polymer block (B) comprises an N-substituted (meth)acrylamide unit (d).

The N-substituted (meth)acrylamide unit (d) in the polymer block (B) is structurally the same as a unit expected to be formed by an additive polymerization of an N-substituted (meth)acrylamide. It should be noted that an N-substituted (meth)acrylamide is a monomer difficult to make undergo an additive polymerization by the living anionic polymerization method usually employed as a block-copolymer production method to be described below.

The N-substituted (meth)acrylamide unit (d) is preferably a unit represented by Formula (Ia) or (Ib).

[Formula 6]

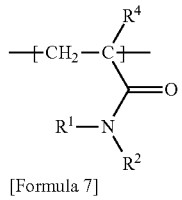

(Ia)

[Formula 7]

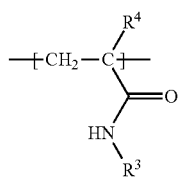

(Ib)

In Formulae (Ia) and (Ib), each of $R^1$, $R^2$, and $R^3$ independently represents an alkyl group optionally having a substituent, a silyl group, an amino group optionally having a substituent, a silanyl group, an alicyclic group optionally having a substituent, a heterocyclic group optionally having a substituent, or an aromatic ring group optionally having a substituent, $R^1$ and $R^2$ together with the nitrogen atom to which they are bound optionally form a ring, and each $R^4$ represents a hydrogen atom or a methyl group.

Examples of the alkyl group optionally having a substituent can include a t-butyl group, a pentyl group, an alkoxy-group-containing alkyl group, a hydroxyhexyl group, a hydroxycarbonylethyl group, an allyl group, an N, N-dimethylaminomethyl group, an aminomethyl group, and the like.

Examples of the amino group optionally having a substituent can include an $NH_2$ group (an unsubstituted amino group), monoalkylamino groups such as a methylamino group, an ethylamino group or the like, dialkylamino groups such as a dimethylamino group, a diethylamino group or the like, cyclic amino groups such as a 1-pyrrolidinyl group, a 1-piperidinyl group or the like, and the like.

Examples of the alicyclic group optionally having a substituent can include a cyclopentanyl group, a cyclohexyl group, a bicyclo[2.2.1]heptanyl group, a tricyclo[5.2.1.0$^{2,6}$] dec-3-enyl group, a 2-ethenylbicyclo[2.2.1]heptanyl group, an N,N-dimethylamino-cyclohexyl group, a t-butyl-cyclohexyl group, and the like.

Examples of the heterocyclic group optionally having a substituent can include an epoxy group, a tetrahydrofuranyl group, a tetrahydro-2H-pyranyl group, a 4-methyl-2-piperidyl group, a pyridinyl group, a 4-methyl-pyridinyl group, and the like.

Examples of the aromatic ring group optionally having a substituent can include a phenyl group, a naphthyl group, a 4-methylphenyl group, a 4-ethenylphenyl group, and the like.

Examples of the ring formed of $R^1$ and $R^2$ together with the nitrogen atom to which they are bound can include a pyrrolidin-1-yl group, a piperidin-1-yl group, a 4-methyl-4-allyl-piperidin-1-yl group, a 4-(3-buten-1-yl)-piperidin-1-yl group, a 4-aminomethyl-piperidin-1-yl group, a morpholin-4-yl group, a 2-oxo-pyrrolidin-1-yl group, and the like.

The polymer block (B) may further comprise a (meth)acrylic acid ester unit (b).

The (meth)acrylic acid ester unit (b) is a unit formed by an additive polymerization of a (meth)acrylic acid ester. Examples of the (meth)acrylic acid ester can be the same as the examples mentioned in the description of the (meth)acrylic acid ester unit (a). It is preferable that the (meth)acrylic acid ester unit (b) is structurally different from the (meth)acrylic acid ester unit (a). As the (meth)acrylic acid ester unit (b), an alkyl (meth)acrylate unit is preferable and a methyl (meth)acrylate unit is more preferable.

The polymer block (B) may further comprise a (meth)acrylic acid unit (c).

The (meth)acrylic acid unit (c) is structurally the same as a unit expected to be formed by an additive polymerization of (meth)acrylic acid. It should be noted that (meth)acrylic acid is a monomer difficult to make undergo an additive polymerization by the living anionic polymerization method usually employed as a block-copolymer production method to be described below.

The polymer block (B) may further comprise an N-substituted bis((meth)acryl)amide unit (e).

The N-substituted bis((meth)acryl)amide unit (e) is structurally the same as a unit expected to be formed by an additive polymerization of an N-substituted bis((meth)acryl)amide. The N-substituted bis((meth)acryl)amide unit (e) may form a ring in one molecular chain, or may form a bridge between two molecular chains or between positions apart from each other in one molecular chain. It should be noted that an N-substituted bis((meth)acryl)amide is a monomer difficult to make undergo an additive polymerization by the living anionic polymerization method usually employed as a block-copolymer production method to be described below.

The N-substituted bis((meth)acryl)amide unit (e) is preferably a unit represented by Formula (II).

[Formula 8]

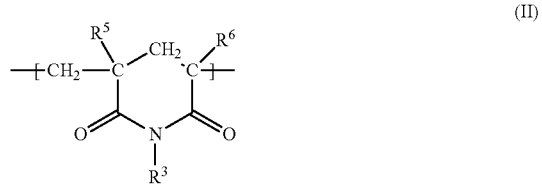

(II)

In Formula (II), each $R^3$ independently represents an alkyl group optionally having a substituent, a silyl group, an amino group optionally having a substituent, a silanyl group, an alicyclic group optionally having a substituent, a heterocyclic group optionally having a substituent, or an aromatic ring group optionally having a substituent, and each of $R^5$ and $R^6$ independently represents a hydrogen atom or a methyl group.

The total molar amount of the (meth)acrylic acid ester unit (b), the N-substituted (meth)acrylamide unit (d), the (meth)acrylic acid unit (c), and the N-substituted bis((meth)acryl)amide unit (e) is preferably not less than 95 mol % and more preferably not less than 99 mol % of the polymer block (B), in which the molar amount of the N-substituted bis((meth)acryl)amide unit (e) is calculated by regarding 1 mol of the N-substituted bis((meth)acryl)amide unit (e) as 2 mol of the N-substituted bis((meth)acryl)amide units (e).

The polymer block (B) may comprise an additional monomer unit in addition to the (meth)acrylic acid ester unit (b), the N-substituted (meth)acrylamide unit (d), the N-substituted bis((meth)acryl)amide unit (e), and the (meth)acrylic acid unit (c), and examples of the additional monomer unit can include an aromatic vinyl monomer unit such as styrene or the like, an α-olefin unit such as ethylene, propylene or the like, a conjugated diene unit such as butadiene, isoprene or the like, and the like.

The number average molecular weight of the polymer block (B) is not particularly limited, but is preferably 500 to 500000.

In the modified acrylic block copolymer according to an embodiment of the present invention, the total molar amount of the N-substituted (meth)acrylamide unit (d), the (meth)acrylic acid unit (c) and the N-substituted bis((meth)acryl)amide unit (e) is preferably not less than 0.1 mol and not more than 100 mol, more preferably not less than 0.1 mol and less than 100 mol, and further preferably not less than 0.1 mol and not more than 95 mol relative to 100 mol of the total molar amount of the (meth)acrylic acid ester unit (b), the N-substituted (meth)acrylamide unit (d), the (meth)acrylic acid unit (c) and the N-substituted bis((meth)acryl)amide unit (e).

The modified acrylic block copolymer according to another embodiment of the present invention satisfies the following relationships:

$$5<([d]+[c])<90; \text{ and}$$

$$0.01<[d]/[c]<0.075\times([d]+[c])+4$$

in which [d] is a molar amount of the N-substituted (meth)acrylamide unit (d) relative to 100 mol of total molar amount of units constituting the polymer block (B), and [c] is a molar amount of the (meth)acrylic acid unit (c) relative to 100 mol of total molar amount of units constituting the polymer block (B).

In the modified acrylic block copolymer according to the present invention, when the value [d]+[c] is low, heat resistance tends to be low, while when the value [d]+[c] is high, viscosity tends to be high and forming processability tends to be low. In the modified acrylic block copolymer according to the present invention, when the value [d]/[c] is too high, tackiness tends to be low.

The modified acrylic block copolymer according to the present invention has a ratio (Mw/Mn) of the weight average molecular weight (Mw) to the number average molecular weight (Mn) of usually 1.0 to 1.5 and preferably 1.0 to 1.3. The modified acrylic block copolymer according to the present invention is not particularly limited in the molecular weight thereof, but preferably has a number average molecular weight of 1000 to 1000000.

In the present invention, the weight average molecular weight and the number average molecular weight are molecular weights in terms of standard polystyrene molecular weights measured by GPC (gel permeation chromatography).

The modified acrylic block copolymer according to the present invention has the mass ratio (A/B) of the polymer block (A) to the polymer block (B) of preferably 20 to 0.5 and more preferably 9 to 1.

The modified acrylic block copolymer according to the present invention is not particularly limited in the configuration of bonding between the polymer block (A) and the polymer block (B). Examples include an A-B diblock copolymer, a linear block copolymer such as A-(B-A)$_n$, B-(A-B)$_n$ or the like, a star block copolymer such as (A-B-)$_m$X, (B-A-)$_m$X or the like, a graft block copolymer such as A-g-B or the like, and the like. A denotes the polymer block (A). B denotes the polymer block (B). g denotes a graft bond. X denotes a coupling agent residue. n denotes the number of repeating of polymer block structures within the parentheses. m denotes the number of polymer block structures within the parentheses bonded to X. The modified acrylic block copolymer according to the present invention preferably comprises at least one polymer block (A) and at least two polymer blocks (B), and is more preferably a B-A-B triblock copolymer.

The method for producing the modified acrylic block copolymer according to the present invention comprises subjecting a block copolymer (C) to a reaction in the presence of an amine compound, wherein the block polymer (C) comprises the polymer block (A) comprising the (meth) acrylic acid ester unit (a) and a polymer block (B') comprising a (meth)acrylic acid ester unit (b'), the (meth)acrylic acid ester unit (a) is structurally different from the (meth) acrylic acid ester unit (b'), thereby partly or entirely converting the (meth)acrylic acid ester unit (b') into at least one selected from the group consisting of the N-substituted (meth)acrylamide unit (d), the (meth)acrylic acid unit (c), and the N-substituted bis((meth)acryl)amide unit (e).

The (meth)acrylic acid ester unit (b') is a unit formed by an additive polymerization of a (meth)acrylic acid ester. Examples of the (meth)acrylic acid ester can be the same as the examples mentioned in the description of the (meth) acrylic acid ester unit (a).

The block copolymer (C) is not particularly limited in the method for producing the same. To obtain a block copolymer having a narrow molecular weight distribution suitable for the present invention, the living polymerization method is preferably employed, and the living radical polymerization method or the living anionic polymerization method can be employed. As for the living polymerization method, it is more preferable to carry out anionic polymerization in the presence of an organic aluminum compound using an organic alkali metal compound as a polymerization initiator because production of a block copolymer having an even narrower molecular weight distribution and a small amount of remaining monomers is possible under relatively mild temperature conditions.

For instance, first the (meth)acrylic acid ester (b') is fed into a polymerization system to produce a living polymer thereof, and then the (meth)acrylic acid ester (a) is fed thereinto to be continuously polymerized from an active anion chain terminus of the living polymer, which can make a diblock copolymer composed of the polymer block (B')-the polymer block (A). Alternatively, first the (meth)acrylic acid ester (a) is fed to perform polymerization and then the (meth)acrylic acid ester (b') is fed to perform polymerization, which can also make a diblock copolymer composed of the polymer block (A)-the polymer block (B').

Moreover, for instance, first the (meth)acrylic acid ester (b') is fed into a polymerization system to produce a living polymer thereof, then the (meth)acrylic acid ester (a) is fed thereinto to continuously polymerized from an active anion chain terminus of the living polymer for making a diblock copolymer composed of the polymer block (B')-the polymer block (A), wherein the diblock copolymer is a living polymer having an active anion chain terminus on the side of the block A, and then the (meth)acrylic acid ester (b') is fed thereinto to continuously polymerized from the active anion chain terminus of the diblock copolymer which can make a triblock copolymer composed of the polymer block (B')-the polymer block (A)-the polymer block (B').

When producing the triblock copolymer in this way, by inverting the order of feeding the (meth)acrylic acid ester (a) and the (meth)acrylic acid ester (b') into the polymerization system, a triblock copolymer composed of the polymer block (A)-the polymer block (B')-the polymer block (A) can be produced.

Moreover, in this method, the (meth)acrylic acid ester (a) or the (meth)acrylic acid ester (b') is sequentially (alternately) fed 4 or more times into the polymerization system for sequentially performing 4 or more of the polymerization steps, a tetrablock copolymer composed of the polymer block (A)-the polymer block (B')-the polymer block (A)-the polymer block (B') or a penta- or higher-block copolymer in which not less than 5 of the polymer block (A) and the polymer block (B') in total are alternately bonded can be produced.

In the method of the present invention, the block copolymer (C) is not particularly limited in the molecular weight of each polymer block or the molecular weight of the entire block copolymer (C). Depending on the intended use and the like of the modified acrylic block copolymer, the molecular weight and the like of the block copolymer (C) can be selected as needed. In general, it is preferable that the polymer block (A) has a number average molecular weight of 500 to 500000, the polymer block (B') has a number average molecular weight of 500 to 500000, and the entire block copolymer (C) has a number average molecular weight of 1000 to 1000000, in terms of formability, ease of handling, mechanical properties, compatibility with other polymers (acrylic resins, vinyl chloride resins, fluororesins, for example), microdispersibility, adhesion properties, tackiness properties, and the like of the modified acrylic block copolymer. The block copolymer (C) is not particularly limited in the ratio (Mw/Mn) of the weight average molecular weight (Mw) to the number average molecular weight (Mn). However, to make the Mw/Mn of the modified acrylic block copolymer fall within the range described above, the Mw/Mn of the block copolymer (C) is preferably 1.0 to 1.5 and more preferably 1.0 to 1.4.

The reaction between the amine compound and the block copolymer (C) is preferably performed under controlling the temperature of a mixture of the block copolymer (C) and the amine compound to be not less than the softening point of the block copolymer (C). The mixture of the block copolymer (C) and the amine compound may comprise, where appropriate, a solvent that can dissolve both of these. The temperature that is not less than the softening point can be achieved by performing melt kneading or thermocompression, for example. In melt kneading, a known kneader such as a single screw extruder, a twin screw extruder, a kneader, a Banbury mixer or the like can be used. Among these, a twin screw extruder, which has a great shearing force for kneading and is capable of continuous operation, is preferably used. Duration of melt kneading is preferably 30 seconds to 100 minutes.

To obtain a resin composition comprising the modified acrylic block copolymer of the present invention and another resin, a method of mixing the modified acrylic block copolymer and the other resin in a molten state or a solution state, or a method of mixing the block copolymer (C) and the other resin in a molten state or a solution state and then subjecting the resultant to a reaction with an amine compound can be employed.

The amount of the amine compound used may be determined as needed, and is preferably 1 to 300 mol and more preferably 2 to 100 mol relative to 100 mol of the (meth) acrylic acid ester unit (b'). The percentage of the conversion reaction with the amine compound (the modification percentage) can be determined by using H-NMR, FT-IR, or the like.

For allowing the conversion reaction to proceed and for inhibiting degradation, discoloration and the like of the resins due to the excess thermal history, the temperature during the reaction is preferably 150 to 400° C., more preferably 180 to 300° C., and further preferably 200 to 280° C.

By the reaction between the amine compound and the block copolymer (C), the (meth)acrylic acid ester (b') is partly or entirely converted into at least one selected from the group consisting of the N-substituted (meth)acrylamide unit (d), the (meth)acrylic acid unit (c), and the N-substituted bis((meth)acryl)amide unit (e). This conversion reaction can also be performed by a method as described in Non-patent Document 1.

The structure of the N-substituted (meth)acrylamide unit (d) or the N-substituted bis((meth)acryl)amide unit (e) depends on the structure of the amine compound used in the reaction. Therefore, by using an amine compound having a functional group such as a hydroxyl group, an allyl group, an amino group, an epoxy group or the like, it is possible to introduce such functional group into the block copolymer (C).

The amine compound used in the reaction is preferably a primary amine or a secondary amine, and is more preferably a primary amine represented by Formula (1) or a secondary amine represented by Formula (2). When the secondary amine is used, the ratio of the percentage of conversion into the (meth)acrylic acid unit (c) to the percentage of conversion into the N-substituted (meth)acrylamide unit (d), namely, [d]/[c] is high.

[Formula 9]

(1)

[Formula 10]

(2)

(In Formulae (1) and (2), each of $R^1$, $R^2$ and $R^3$ independently represents an alkyl group optionally having a substituent, a silyl group, an amino group optionally having a substituent, a silanyl group, an alicyclic group optionally having a substituent, a heterocyclic group optionally having a substituent, or an aromatic ring group optionally having a substituent, and $R^1$ and $R^2$ together with the nitrogen atom to which they are bound optionally form a ring.)

Specific examples of the amine compound can include 6-hydroxyhexylamine, cyclohexylamine, N-methylcyclohexylamine, 4-(N,N-dimethylamine)-cyclohexylamine, allylamine, 4-allyl-4-methylpiperidine, 4-(3-buten-1-yl)-piperidine, 4-aminomethylpiperidine, morpholine, 2-oxopyrrolidine, piperidine, pyrrolidine, 4-t-butylcyclohexylamine, 2-(isopropylamino)ethanol, 3-aminopropyltriethoxysilane, 3-aminopropylmethyldimethoxysilane, 3-aminopropylmethyldiethoxysilane, 3-aminopropyltriethoxysilane, and the like.

The modified acrylic block copolymer according to the present invention can comprises an additive that can be usually added to a resin, as needed. Examples of the additive can include an antioxidant, a heat stabilizer, a plasticizer, a lubricant, an ultraviolet absorber, an antistatic agent, a colorant, an anti-shrinkage agent, a light stabilizer, an anti-fogging agent, a pigment, a flame retardant, an anti-blocking agent, a filler, and the like.

Examples of the filler can include calcium carbonate, talc, clay, synthetic silicon, titanium oxide, carbon black, barium sulfate, mica, glass fiber, whisker, carbon fiber, magnesium carbonate, glass powder, metal powder, kaolin, graphite, molybdenum disulfide, zinc oxide, and the like.

The modified acrylic block copolymer according to the present invention can be used as mixed with an additional thermoplastic polymer provided that the effects of the present invention are not impaired. Examples of the additional thermoplastic polymer can include polyphenylene ether resins; polyamide resins such as polyamide 6, polyamide 6.6, polyamide 6.10, polyamide 11, polyamide 12, polyamide 6.12, polyhexamethylenediamine terephthalamide, polyhexamethylenediamine isophthalamide, polyamides containing a xylene group or the like; polyester resins such as polyethylene terephthalate, polybutylene terephthalate or the like; polyoxymethylene resins such as polyoxymethylene homopolymers, polyoxymethylene copolymers or the like; styrene resins such as styrene homopolymers, acrylonitrile.styrene resins, acrylonitrile.butadiene.styrene resins or the like; acrylic resins; polycarbonate resins; ethylene elastomers such as ethylene.propylene copolymer rubber (EPM), ethylene.propylene.non-conjugated diene copolymer rubber (EPDM) or the like; styrene elastomers such as styrene.butadiene copolymer rubber, styrene.isoprene copolymer rubber or the like, hydrogenated products or modified products of the styrene elastomers; natural rubber; synthetic isoprene rubber, liquid polyisoprene rubber or the like, and hydrogenated products or modified products thereof; chloroprene rubber; acrylic rubber; butyl rubber; acrylonitrile.butadiene rubber; epichlorohydrin rubber; silicone rubber; fluororubber; chlorosulfonated polyethylene; urethane rubber; polyurethane elastomers; polyamide elastomers; polyester elastomers; flexible polyvinyl chloride resins; and the like.

For example, the modified acrylic block copolymer according to the present invention can be formed into various formed articles by a method such as the injection molding method, the extrusion method, the inflation forming method, the T-die film formation method, the lamination method, the blow molding method, the hollow molding method, the compression molding method, the calendering method or the like. For example, the modified acrylic block copolymer of the present invention can be subjected to formation by the T-die film formation method to give a monolayer film thereof, or can be subjected to coextrusion with other thermoplastic resins to give a multi-layered film.

The formed articles made from the modified acrylic block copolymer according to the present invention can be used in various applications. Examples thereof can include automotive interior members such as instrumental panels, center panels, center console boxes, door trims, pillars, assist grips, steering wheels, air bag covers, air ducts or the like; automobile exterior members such as weather strips, bumpers, moldings, glass run channels or the like; appliance members such as bumpers of vacuum cleaners, remote-control switches, various keycaps for office automation equipment, televisions, stereos or the like; products for underwater use such as goggles, jackets of underwater cameras or the like; various covering members, and various industrial components having gaskets used, for example, for hermetic sealing, waterproof, soundproof, or vibration-proof purposes; automobile functional members such as racks, pinion boots, suspension boots, constant velocity joint boots or the like; belts, hoses, tubes; electric and electronic components such as coating on power lines and noise reducer gears; sporting-goods; sundry goods; stationery products; building materials such as doors, window frame materials or the like; various joints; valve members; medical supplies such as gaskets for medical syringes, bags, tubes or the like; hot-melt sealing materials; stretchy materials such as rubber threads, stretch films or the like; components in the video-recording field, such as wires, cables, and taking lenses, viewfinders, filters, prisms and Fresnel lenses for cameras, VTRs and projectors or the like; lens components such as pickup lenses for optical discs in CD players, DVD players, MD players or the like; optical recording components for optical discs in CD players, DVD players, MD players or the like; components of information equipment, for example, light guide plates for liquid crystal displays, films for liquid crystal displays such as polarizer protective films, retardation films or the like, surface protective films or the like; components for optical communications such as optical fibers, optical switches, optical connectors or the like; vehicle members such as headlights, tail lamp lenses, inner lenses, gauge covers, sunroofs of automobiles; medical equipment components such as glasses, contact lenses, endoscope lenses, medical supplies that need sterilization; building and construction components such as translucent panels on roadside, lenses for double glazing, transom windows, carports, lenses for lighting fixtures, lighting covers, and siding boards for building use; containers (eating utensils) for microwave cooking, housings for appliances, toys, sunglasses, stationery products, and the like.

The acrylic adhesive according to the present invention comprises the modified acrylic block copolymer according to the present invention.

It is preferable that the adhesive agent of the present invention further comprises a tackifier resin. When the tackifier resin is comprised, regulation of a tack level, adhesivity and retentivity is easily performed. Examples of the tackifier resin can include natural resins such as rosin resins, terpene resins or the like; synthetic resins such as petroleum resins, hydrogen-added (hereinafter, sometimes called "hydrogenated") petroleum resins, styrene resins, coumarone-indene resins, phenolic resins, xylene resins or the like.

Examples of the rosin resins can include rosins such as gum rosin, tall oil rosin, wood rosin or the like; modified rosins such as hydrogenated rosins, disproportionated rosins, polymerized rosins or the like; rosin esters such as glyceryl esters and pentaerythritol esters of these rosins and these modified rosins; and the like.

Examples of the terpene resin can include terpene resins mainly composed of α-pinene, β-pinene, dipentene, and the like, aromatic-modified terpene resins, hydrogenated terpene resins, terpene phenolic resins, and the like.

Examples of the petroleum resins or hydrogenated petroleum resins can include aliphatic (C5) petroleum resins, aromatic (C9) petroleum resins, copolymerized (C5/C9) petroleum resins, dicyclopentadiene petroleum resins, hydrogenated aliphatic (C5) petroleum resins, hydrogenated aromatic (C9) petroleum resins, hydrogenated copolymerized (C5/C9) petroleum resins, hydrogenated dicyclopentadiene petroleum resins, alicyclic saturated hydrocarbon resins, and the like.

Examples of the styrene resins can include poly a methylstyrene, α-methylstyrene/styrene copolymers, styrene-monomers/aliphatic-monomers copolymers, styrene-monomers/α-methylstyrene/aliphatic-monomers copolymers, copolymers of styrene monomers, styrene-monomers/aromatic-monomers copolymers, and the like.

Among these tackifier resins, in view of excellent adhesivity, terpene resins, rosin resins, (hydrogenated) petroleum resins, and styrene resins are preferable. Particularly, in view of excellent heat resistance and excellent transparency, (hydrogenated) petroleum resins and styrene resins are more preferable. These may be used alone or with a combination of two or more of these. The softening point of the tackifier resin is preferably 50° C. to 150° C. in view of excellent adhesion.

The amount of the tackifier resin can be determined as needed depending on the intended use of the adhesive agent, the kind of the adherend, and the like. From the viewpoints of enhancing adhesivity and improving coating/application properties, the amount of the tackifier resin is preferably not less than 1 part by mass and not more than 400 parts by mass and is more preferably not less than 10 parts by mass and not more than 150 parts by mass relative to 100 parts by mass of the modified acrylic block copolymer.

It is preferable that the acrylic adhesive of the present invention further comprises a plasticizer. Examples of the plasticizer can include fatty acid esters, including phthalic acid esters such as dibutyl phthalate, di-n-octyl phthalate, bis-2-ethylhexyl phthalate, di-n-decyl phthalate, diisodecyl phthalate or the like, adipic acid esters such as bis-2-ethylhexyl adipate, di-n-octyl adipate or the like, sebacic acid esters such as bis-2-ethylhexyl sebacate, di-n-butyl sebacate or the like, azelaic acid esters such as bis-2-ethylhexyl azelate or the like; paraffins such as chlorinated paraffin or the like; glycols such as polypropylene glycol or the like; epoxy polymer plasticizers such as epoxidized soybean oil, epoxidized linseed oil or the like; phosphoric acid esters such as trioctyl phosphate, triphenyl phosphate or the like; phosphorous acid esters such as triphenyl phosphite or the like; ester oligomers such as an ester of adipic acid and 1,3-butylene glycol, or the like; acrylic oligomers such as poly n-butyl (meth)acrylate, poly 2-ethylhexyl (meth)acrylate or the like; polybutenes; polyisobutylenes; polyisoprenes; processed oils; naphthene oils; and the like. These can be used alone or with a combination of two or more of these.

The amount of the plasticizer can be determined as needed depending on the intended use of the adhesive agent, the kind of the adherend, and the like. In order to preserve adhesion, the amount of the plasticizer is preferably not less than 1 part by mass and not more than 400 parts by mass and is more preferably not less than 10 parts by mass and not more than 150 parts by mass relative to 100 parts by mass of the modified acrylic block copolymer.

The adhesive agent according to the present invention may further comprise various additives, where appropriate. Examples of the additives can include an antioxidant, a heat stabilizer, an ultraviolet absorber, an antistatic agent, a colorant, an anti-shrinkage agent, a light stabilizer, an anti-fogging agent, a pigment, a flame retardant, a filler, and the like.

Examples of the filler can include calcium carbonate, talc, clay, synthetic silicon, titanium oxide, carbon black, barium sulfate, mica, glass fiber, whisker, carbon fiber, magnesium carbonate, glass powder, metal powder, kaolin, graphite, molybdenum disulfide, zinc oxide, and the like.

The method for producing the adhesive agent according to the present invention is not particularly limited. For example, the production can be performed by mixing the components by using a known mixing or kneading apparatus such as a kneader-ruder, an extruder, a mixing roll, or a Banbury mixer at a temperature usually within the range from 100° C. to 250° C. Alternatively, the production may be performed by dissolving and mixing the components in an organic solvent and then distilling the organic solvent off.

The adhesive agent according to the present invention can also be dissolved in a solvent such as toluene, methyl ethyl ketone or the like to obtain a solvent-containing adhesive as in the solution state.

The adhesive product of the present invention comprises an adhesive layer comprising the adhesive agent according to the present invention. The adhesive layer is usually formed on a base material. The base material can be in a film form, a sheet form, a tape form, or another desirable form. Examples of the material of the base material can include organic polymers (including celluloses such as TAC, for example), processed fiber products (paper, cloth, for example), wood, metal, and the like.

Examples of the adhesive product of the present invention can include adhesive sheet (including adhesive film), adhesive tape, pressure-sensitive tape, masking tape, dielectric tape, film for lamination use, medical fomentation, decorative adhesive sheet, adhesive optical film, and the like.

The adhesive product of the present invention can be produced, for example, by heating the adhesive agent of the present invention into a molten state, applying the resultant to a base material, and then cooling the resultant. The adhesive product of the present invention can also be produced, for example, by dissolving the adhesive agent of the present invention in a solvent such as toluene, methyl ethyl ketone or the like to obtain a solution, applying the solution to a base material, and then allowing the solvent to evaporate.

EXAMPLES

The present invention will be described in more detail by examples and comparative examples. The scope of the present invention is, however, not limited by the following examples.

Physical properties were measured by the following methods.

(Determinate Quantity of N-Substituted (Meth)Acrylamide Unit (d) and N-Substituted Bis((Meth)Acryl)Amide Unit (e))

$^1$H-NMR was employed for determination. For example, in the case of a modified acrylic block copolymer that was obtained by subjecting an acrylic block copolymer (C') comprising a poly methyl methacrylate block (B)-a poly n-butyl acrylate (A)-a poly methyl methacrylate block (B) to a reaction with cyclohexylamine, a signal attributable to a proton bonded to a carbon atom bonded to the oxygen atom in an oxy group of a methyl methacrylate unit (O—C—$^1$H̲) and a proton bonded to a carbon atom bonded to a nitrogen atom in an N-substituted (meth)acrylamide unit (N—C—$^1$H̲) appeared at 3.6 ppm, a signal attributable to a proton bonded to a carbon atom bonded to the oxygen atom in an oxy group of a n-butyl acrylate unit (O—C—$^1$H̲) appeared at 4.0 ppm, and a signal attributable to a proton bonded to a carbon atom bonded to a nitrogen atom in an N-substituted bis((meth)acryl)amide unit (N—C—$^1$H̲) appeared at 4.3 ppm. The integrals of the signals and the results of determinate quantity of the (meth)acrylic acid unit described below were used to determine the amounts of the N-substituted (meth)acrylamide unit and the N-substituted bis((meth)acryl)amide unit. The amount of the N-substituted bis((meth)acryl)amide unit was calculated by regarding 1 mol of the N-substituted bis((meth)acryl)amide unit (e) as 2 mol of the N-substituted bis((meth)acryl)amide units (e).

(Determinate Quantity of (Meth)Acrylic Acid Unit (c))

A modified acrylic block copolymer in an amount of 5.0 g was dissolved in a mixed solution of toluene/ethanol (mass ratio: 9/1). To the resulting solution, a 0.1M potassium hydroxide ethanol solution was added dropwise at 0.1 ml/20 sec, and potentiometric titration was thus carried out. From the results of titration, the amount of carboxyl groups derived from (meth)acrylic acid was calculated, and the amount of a (meth)acrylic acid unit was determined.

(Measurement of Dynamic Viscoelasticity)

A sheet having a thickness of 0.5 mm was cut into strips having a width of 5 mm. The strips were subjected to measurement of dynamic viscoelasticity. Measurement of dynamic viscoelasticity was carried out on a viscoelasticity analyzer (manufactured by Rheology Co., Ltd., "DVE-V4") under conditions at a frequency of 1 Hz.

Reference Example 1 [Synthesis of Block Copolymer (C")]

A three-necked flask equipped with a three-way cock was evacuated, followed by replacement with nitrogen. To the flask, 1040 g of dry toluene and 100 g of 1,2-dimethoxyethane were added at room temperature, and thereto, 48 g of a toluene solution containing 32 mmol of isobutylbis(2,6-di-t-butyl-4-methylphenoxy) aluminum was added. Thereto, 8.1 mmol of sec-butyllithium was added. Thereto, 33 g (0.33 mol) of methyl methacrylate was added, and the resultant was stirred at room temperature for 1 hour for polymerization. By the polymerization, a poly methyl methacrylate block (a PMMA block [b1]) having an Mw of 9900 and an Mw/Mn of 1.08 was formed.

Subsequently, the temperature of the reaction mixture was made to be −25° C., and thereto 384 g (3.0 mol) of n-butyl acrylate was added dropwise over 2 hours for polymerization. By the polymerization, a poly n-butyl acrylate block (a PnBA block [a]) was formed extending from an end of the PMMA block [b1].

Furthermore, 33 g (0.33 mol) of methyl methacrylate was added, the temperature of the reaction mixture was made back to be room temperature, followed by stirring for 8 hours for polymerization. By the polymerization, a poly methyl methacrylate block (a PMMA block [b2]) having an Mw of 9900 and an Mw/Mn of 1.08 was formed extending from an end of the PnBA block [a].

To the resulting reaction mixture, 4 g of methanol was added to terminate polymerization. The reaction mixture after termination of polymerization was poured into a large amount of methanol to precipitate solid matter. The resulting solid matter was a triblock copolymer (C") comprising the PMMA block [b1]-the PnBA block [a]-the PMMA block [b2]. The triblock copolymer (C") had an Mw of 62000 and an Mw/Mn of 1.19, and comprised 7.3% by mass (9.0 mol %) of the PMMA block [b1], 85.4% by mass (82 mol %) of the PnBA block [a], and 7.3% by mass (9.0 mol %) of the PMMA block [b2].

The block copolymer (C") was dissolved in tetrahydrofuran. The resulting solution was subjected to casting at room temperature. Subsequently, heating was performed at 220° C. for 30 minutes using a compression forming machine. The workpiece was taken out of the compression forming machine, followed by vacuum drying overnight at 100° C. to give a sheet having a thickness of 0.5 mm. The dynamic viscoelasticity of the sheet was measured.

A peak of the loss elastic modulus that was probably attributable to the PnBA block [a] was observed at −44° C. The temperature at which the loss elastic modulus dropped probably because of the PMMA blocks [b1] and [b2] was 144° C.

Example 1 [Synthesis of Modified Acrylic Block Copolymer (1)]

A twin screw extruder (manufactured by Parker Corporation, Inc.) was fed with the block copolymer (C") at 0.6 kg/h from a hopper. Cyclohexylamine was added at the midpoint of the cylinder in an amount of 25 mol relative to 100 mol of a methyl methacrylate unit in the block copolymer (C"). Melt kneading was performed at a cylinder temperature (a reaction temperature) of 240° C. and a rotational speed of the screw of 200 rpm to give a modified acrylic block copolymer (1).

The proportion of monomer units in the modified acrylic block copolymer (1) was analyzed. The results are shown in Table 1.

The modified acrylic block copolymer (1) was dissolved in tetrahydrofuran. The resulting solution was subjected to casting at room temperature. Subsequently, heating was performed at 220° C. for 30 minutes using a compression forming machine. The workpiece was taken out of the compression forming machine, followed by vacuum drying overnight at 100° C. to give a sheet having a thickness of 0.5 mm. The dynamic viscoelasticity of the sheet was measured.

A peak of the loss elastic modulus that was probably attributable to the PnBA block [a] was observed at −44° C. The temperature at which the loss elastic modulus dropped probably because of the PMMA blocks [b1] and [b2] was 164° C.

The temperature at which the loss elastic modulus of the modified acrylic block copolymer (1) dropped probably because of the PMMA blocks [b1] and [b2], which were hard segments, was relatively high with the block polymer (C"), while the position of the peak of the loss elastic modulus probably attributable to the PnBA block [a], which was a soft segment, did not change. The results show that the amine compound reacted with only the PMMA blocks [b1] and [b2].

Example 2 [Synthesis of Modified Acrylic Block Copolymer (2)]

A twin screw extruder (manufactured by Parker Corporation, Inc.) was fed with the block copolymer (C") at 0.6 kg/h from a hopper. Cyclohexylamine was added at the midpoint of the cylinder in an amount of 80 mol relative to 100 mol of a methyl methacrylate unit in the block copolymer (C"). Melt kneading was performed at a cylinder temperature (a reaction temperature) of 240° C. and a rotational speed of the screw of 200 rpm to give a modified acrylic block copolymer (2).

The proportion of monomer units in the modified acrylic block copolymer (2) was analyzed. The results are shown in Table 1.

The modified acrylic block copolymer (2) was dissolved in tetrahydrofuran. The resulting solution was subjected to casting at room temperature. Subsequently, heating was performed at 220° C. for 30 minutes using a compression forming machine. The workpiece was taken out of the compression forming machine, followed by vacuum drying overnight at 100° C. to give a sheet having a thickness of 0.5 mm. The dynamic viscoelasticity of the sheet was measured.

A peak of the loss elastic modulus that was probably attributable to the PnBA block [a] was observed at −44° C. The temperature at which the loss elastic modulus dropped probably because of the PMMA blocks [b1] and [b2] was 194° C.

Example 3 [Synthesis of Modified Acrylic Block Copolymer (3)]

The block copolymer (C") in an amount of 5 g, toluene in an amount of 35 g, and cyclohexylamine in an amount of 100 mol relative to 100 mol of a methyl methacrylate unit in the block copolymer (C") were introduced into an autoclave equipped with a stirring blade, and the interior of the autoclave was replaced with nitrogen.

While the temperature in the autoclave (the reaction temperature) being maintained at 200° C., a reaction was allowed to proceed for 4 hours to give a modified acrylic block copolymer (3).

The proportion of monomer units in the modified acrylic block copolymer (3) was analyzed. The results are shown in Table 1.

Example 4 [Synthesis of Modified Acrylic Block Copolymer (4)]

A modified acrylic block copolymer (4) was obtained in the same manner as in Example 3 except that the reaction time was changed to 5 hours.

The proportion of monomer units in the modified acrylic block copolymer (4) was analyzed. The results are shown in Table 1.

TABLE 1

|  | Ref. Ex. | Ex. | | | |
| --- | --- | --- | --- | --- | --- |
|  | 1 | 1 | 2 | 3 | 4 |
| block copolymer | (C") |  |  |  |  |
| modified acrylic block copolymer |  | (1) | (2) | (3) | (4) |
| polymer block [A] |  |  |  |  |  |
| (a)n-butyl acrylate unit[mol %] | 82 | 82 | 82 | 82 | 82 |
| polymer block [B] |  |  |  |  |  |
| (b)methyl methacrylate unit[mol %] | 18 | 14 | 7.6 | 12.2 | 5.6 |
| (c)methacrylic acid unit[mol %] | 0.0 | 1.6 | 2.7 | 0.9 | 1.8 |
| (d)N-cyclohexylmethacrylamide unit[mol %] | 0.0 | 1.9 | 6.5 | 3.6 | 9.2 |
| (d)N-methyl-N-cyclohexylmethacrylamide unit[mol %] | 0.0 | 0.0 | 0.0 | 0.0 | 0.0 |
| (e)N-cyclohexylbis(methacryl)amide unit[mol %] | 0.0 | 0.5 | 1.3 | 1.3 | 1.4 |

TABLE 1-continued

|  | Ref. Ex. | Ex. | | | |
|---|---|---|---|---|---|
|  | 1 | 1 | 2 | 3 | 4 |
| molar ratio | | | | | |
| (c + d)/(b + c + d + e) × 100 | 0 | 19 | 51 | 24.8 | 61 |
| d/c | 0 | 1.2 | 2.4 | 4.2 | 5.1 |
| (c + d + e)/(b + c + d + e) × 100 | 0 | 22 | 58 | 32 | 69 |

Example 5 [Synthesis of Modified Acrylic Block Copolymer (5)]

A modified acrylic block copolymer (5) was obtained in the same manner as in Example 4 except that the reaction temperature was changed to 240° C.

The proportion of monomer units in the modified acrylic block copolymer (5) was analyzed. The results are shown in Table 2.

Example 6 [Synthesis of Modified Acrylic Block Copolymer (6)]

A modified acrylic block copolymer (6) was obtained in the same manner as in Example 4 except that cyclohexylamine was changed to N-methylcyclohexylamine.

The proportion of monomer units in the modified acrylic block copolymer (6) was analyzed. The results are shown in Table 2.

Example 7 [Synthesis of Modified Acrylic Block Copolymer (7)]

A modified acrylic block copolymer (7) was obtained in the same manner as in Example 6 except that the reaction temperature was changed to 220° C.

The proportion of monomer units in the modified acrylic block copolymer (7) was analyzed. The results are shown in Table 2.

Example 8 [Synthesis of Modified Acrylic Block Copolymer (8)]

A modified acrylic block copolymer (8) was obtained in the same manner as in Example 3 except that the amount of cyclohexylamine was changed to 150 mol relative to 100 mol of a methyl methacrylate unit in the block copolymer (C") and the reaction time was changed to 8 hours.

The proportion of monomer units in the modified acrylic block copolymer (8) was analyzed. The results are shown in Table 2.

Example 9 [Synthesis of Modified Acrylic Block Copolymer (9)]

A modified acrylic block copolymer (9) was obtained in the same manner as in Example 3 except that the amount of cyclohexylamine was changed to 200 mol relative to 100 mol of a methyl methacrylate unit in the block copolymer (C") and the reaction time was changed to 1 hour.

The proportion of monomer units in the modified acrylic block copolymer (9) was analyzed. The results are shown in Table 2.

TABLE 2

|  | Ex. | | | | |
|---|---|---|---|---|---|
|  | 5 | 6 | 7 | 8 | 9 |
| block copolymer | | | | | |
| modified acrylic block copolymer | (5) | (6) | (7) | (8) | (9) |
| polymer block [A] | | | | | |
| (a)n-butyl acrylate unit[mol %] | 82 | 82 | 82 | 82 | 82 |
| polymer block [B] | | | | | |
| (b)methyl methacrylate unit[mol %] | 2.0 | 12.4 | 5.0 | 0.7 | 16 |
| (c)methacrylic acid unit[mol %] | 1.4 | 5.4 | 9.2 | 1.8 | 0.2 |
| (d)N-cyclohexylmethacrylamide unit[mol %] | 13.5 | 0.0 | 0.0 | 15.3 | 1.6 |
| (d)N-methyl-N-cyclohexylmethacryl-amide unit[mol %] | 0.0 | 0.2 | 3.8 | 0.0 | 0.0 |
| (e)N-cyclohexylbis(methacryl)amide unit[mol %] | 1.1 | 0.0 | 0.0 | 0.2 | 0.2 |
| molar ratio | | | | | |
| (c + d)/(b + c + d + e) × 100 | 83 | 31 | 72 | 95 | 10 |
| d/c | 9.4 | 0.0 | 0.4 | 8.5 | 8.0 |
| (c + d + e)/(b + c + d + e) × 100 | 89 | 31 | 72 | 96 | 11 |

(Adhesivity)

From the adhesive tape, a test piece having a width of 25 mm and a length of 200 mm was cut out. The test piece was placed on a stainless steel (SUS304) plate and, over the test piece, a rubber roller was rolled back and forth twice at a load of 2 kg, so as to affix the test piece to the stainless steel plate. The resultant was stored in an environment at 23° C. and 50% RH for 24 hours. Subsequently, in conformity with JIS Z0237, adhesion strength against peeling at 180° was measured at a peeling speed of 300 mm/minute. The higher the peel force was, the better the tack strength was.

(Retentivity)

The adhesive tape was cut into a test piece measuring 25 mm laterally (a direction orthogonal to the direction of the load)×10 mm longitudinally (the same direction as the direction of the load). The test piece was placed on a stainless steel (SUS304) plate and, over the test piece, a rubber roller was rolled back and forth twice at a load of 2 kg, so as to affix the test piece to the stainless steel plate. To the test piece, a weight of 1 kg was attached, and the resultant was left under two sets of conditions at a temperature of 150° C. In conformity with JIS 20237, the time until the weight fell was measured. The longer the time until the weight fell was, the higher the adhesion endurance (retentivity) at a high temperature was.

(Melt Viscosity)

Using a capilograph (manufactured by Toyo Seiki Seisaku-sho, Ltd.), viscosity at 200° C. and a shear rate of 100 $sec^{-1}$ were measured.

Example 10

The modified acrylic block copolymer (1) was dissolved in tetrahydrofuran to give a solution having a concentration of 30% by mass. The solution was applied onto a polyethylene terephthalate film with a coater. Subsequently, the film was subjected to heat treatment at 60° C. for 30 minutes to give an adhesive tape. The adhesivity and the retentivity of the adhesive tape were measured. The melt viscosity of the modified acrylic block copolymer (1) was also measured. The results are shown in Table 3.

Example 11

An adhesive tape was obtained in the same manner as in Example 10 except that the modified acrylic block copolymer (1) was changed to the modified acrylic block copolymer (2). The adhesivity and the retentivity of the adhesive tape were measured. The melt viscosity of the modified acrylic block copolymer (2) was also measured. The results are shown in Table 3.

Example 12

An adhesive tape was obtained in the same manner as in Example 10 except that the modified acrylic block copolymer (1) was changed to the modified acrylic block copolymer (3). The adhesivity and the retentivity of the adhesive tape were measured. The melt viscosity of the modified acrylic block copolymer (3) was also measured. The results are shown in Table 3.

Example 13

An adhesive tape was obtained in the same manner as in Example 10 except that the modified acrylic block copolymer (1) was changed to the modified acrylic block copolymer (4). The adhesivity and the retentivity of the adhesive tape were measured. The melt viscosity of the modified acrylic block copolymer (4) was also measured. The results are shown in Table 3.

Example 14

An adhesive tape was obtained in the same manner as in Example 10 except that the modified acrylic block copolymer (1) was changed to the modified acrylic block copolymer (5). The adhesivity and the retentivity of the adhesive tape were measured. The melt viscosity of the modified acrylic block copolymer (5) was also measured. The results are shown in Table 3.

Example 15

An adhesive tape was obtained in the same manner as in Example 10 except that the modified acrylic block copolymer (1) was changed to the modified acrylic block copolymer (6). The adhesivity and the retentivity of the adhesive tape were measured. The melt viscosity of the modified acrylic block copolymer (6) was also measured. The results are shown in Table 3.

Example 16

An adhesive tape was obtained in the same manner as in Example 10 except that the modified acrylic block copolymer (1) was changed to the modified acrylic block copolymer (7). The adhesivity and the retentivity of the adhesive tape were measured. The melt viscosity of the modified acrylic block copolymer (7) was also measured. The results are shown in Table 3.

Example 17

An adhesive tape was obtained in the same manner as in Example 10 except that the modified acrylic block copolymer (1) was changed to the modified acrylic block copolymer (8). The adhesivity and the retentivity of the adhesive tape were measured. The melt viscosity of the modified acrylic block copolymer (8) was also measured. The results are shown in Table 3.

Example 18

An adhesive tape was obtained in the same manner as in Example 10 except that the modified acrylic block copolymer (1) was changed to the modified acrylic block copolymer (9). The adhesivity and the retentivity of the adhesive tape were measured. The melt viscosity of the modified acrylic block copolymer (9) was also measured. The results are shown in Table 3.

Comparative Example 1

The block copolymer (C") was dissolved in tetrahydrofuran to give a solution having a concentration of 30% by mass. The solution was applied onto a polyethylene terephthalate film with a coater. Subsequently, the film was subjected to heat treatment at 60° C. for 30 minutes to give an adhesive tape. The adhesivity and the retentivity of the adhesive tape were measured. The melt viscosity of the block copolymer (C") was also measured. The results are shown in Table 3.

TABLE 3

| | Ex. | | | | | | | | | Comp. Ex. |
| --- | --- | --- | --- | --- | --- | --- | --- | --- | --- | --- |
| | 10 | 11 | 12 | 13 | 14 | 15 | 16 | 17 | 18 | 1 |
| adhesivity [N] | 19 | 23 | 20 | 23.5 | 20 | 23.3 | 23.5 | 17 | 17.8 | 17.6 |
| retentivity [min.] | >100 | >100 | >100 | >100 | >100 | >100 | >100 | >100 | >100 | 13 |
| melt viscosity [Pa · s] | 800 | 2000 | 950 | 2100 | 2400 | 900 | 2200 | 3000 | 600 | 150 |

Compared to the adhesive tape obtained in Comparative Example 1, the adhesive tapes obtained in Examples are excellent in adhesivity and retentivity. The acrylic adhesive obtained in Examples have moderate melt viscosity and are suitable for forming and processing.

Example 19

An adhesive tape was obtained in the same manner as in Example 10 except that the modified acrylic block copolymer (1) was changed to a resin composition (10) comprising 100 parts by mass of the modified acrylic block copolymer (1) and 35 parts by mass of a tackifier resin (trade name "KE311", manufactured by Arakawa Chemical Industries, Ltd., special rosin ester resin). The adhesivity and the retentivity of the adhesive tape were measured. The melt viscosity of the resin composition (10) was also measured. The results are shown in Table 4.

Example 20

An adhesive tape was obtained in the same manner as in Example 10 except that the modified acrylic block copolymer (1) was changed to a resin composition (11) comprising 100 parts by mass of the modified acrylic block copolymer (2) and 35 parts by mass of a tackifier resin (trade name "KE311", manufactured by Arakawa Chemical Industries, Ltd., special rosin ester resin). The adhesivity and the retentivity of the adhesive tape were measured. The melt viscosity of the resin composition (11) was also measured. The results are shown in Table 4.

Example 21

An adhesive tape was obtained in the same manner as in Example 10 except that the modified acrylic block copolymer (1) was changed to a resin composition (12) comprising 100 parts by mass of the modified acrylic block copolymer (1), 35 parts by mass of a tackifier resin (trade name "KE311", manufactured by Arakawa Chemical Industries, Ltd., special rosin ester resin), and 50 parts by mass of a plasticizer (trade name "ARUFON UP-1010", manufactured by Toagosei Co., Ltd., acrylic resin). The adhesivity and the retentivity of the adhesive tape were measured. The melt viscosity of the resin composition (12) was also measured. The results are shown in Table 4.

Comparative Example 2

An adhesive tape was obtained in the same manner as in Example 10 except that the modified acrylic block copolymer (1) was changed to a resin composition (13) comprising 100 parts by mass of the block copolymer (C'') and 35 parts by mass of a tackifier resin (trade name "KE311", manufactured by Arakawa Chemical Industries, Ltd., special rosin ester resin). The adhesivity and the retentivity of the adhesive tape were measured. The melt viscosity of the resin composition (13) was also measured. The results are shown in Table 4.

Comparative Example 3

An adhesive tape was obtained in the same manner as in Example 10 except that the modified acrylic block copolymer (1) was changed to a resin composition (14) comprising 100 parts by mass of the block copolymer (C''), 35 parts by mass of a tackifier resin (trade name "KE311", manufactured by Arakawa Chemical Industries, Ltd., special rosin ester resin), and 50 parts by mass of a plasticizer (trade name "ARUFON UP-1010", manufactured by Toagosei Co., Ltd., acrylic resin). The adhesivity and the retentivity of the adhesive tape were measured. The melt viscosity of the resin composition (14) was also measured. The results are shown in Table 4.

TABLE 4

|  | Ex. | | | Comp. Ex. | |
| --- | --- | --- | --- | --- | --- |
|  | 19 | 20 | 21 | 2 | 3 |
| adhesivity [N] | 18.4 | 20.9 | 13.1 | 17.4 | 9.1 |
| retentivity[min.] | 94 | 90 | 70 | 1.7 | 1 |
| melt viscosity[Pa · s] | 500 | 1100 | 200 | 70 | 30 |

Compared to the adhesive tapes obtained in Comparative Examples 2 and 3, the adhesive tapes obtained in Examples are excellent in adhesivity and retentivity. The acrylic adhesive obtained in Examples have moderate melt viscosity and are suitable for forming and processing.

As shown in the results, an adhesive agent comprising the modified acrylic block copolymer according to the present invention has excellent tack strength and retentivity compared to a tackifier agent containing a conventional block copolymer. In addition, addition of a tackifier resin or a plasticizer decreases melt viscosity, which makes it possible to apply the tackifier agent of the present invention in a molten state.

The invention claimed is:
1. A modified acrylic block copolymer, comprising:
   a polymer block (A) comprising a (meth)acrylic acid ester unit (a), and
   a polymer block (B) comprising an N-substituted (meth)acrylamide unit (d) and a (meth)acrylic acid ester unit (b) and/or a (meth)acrylic acid unit (c), wherein the (meth)acrylic acid ester unit (b) is structurally different from the (meth)acrylic acid ester unit (a);
wherein
   a ratio (Mw/Mn) of a weight average molecular weight (Mw) to a number average molecular weight (Mn) is 1.0 to 1.5, and
   the polymer block (B) satisfies the following relationships:

$$5<([d]+[c])<90; \text{ and}$$

$$0.01<[d]/[c]<0.075\times([d]+[c])+4;$$

wherein
   [d] is a molar amount of the N-substituted (meth)acrylamide unit (d) relative to 100 mol of total molar amount of units constituting the polymer block (B) and
   [c] is a molar amount of the (meth)acrylic acid unit (c) relative to 100 mol of total molar amount of units constituting the polymer block (B).

2. The modified acrylic block copolymer according to claim 1, wherein the (meth)acrylic acid ester unit (a) is an alkyl (meth)acrylate unit that is not a methyl (meth)acrylate unit.

3. The modified acrylic block copolymer according to claim 1, wherein the (meth)acrylic acid ester unit (b) is a methyl (meth)acrylate unit.

4. The modified acrylic block copolymer according to claim 1, wherein the N-substituted (meth)acrylamide unit (d) is a unit represented by Formula (Ia) or (Ib):

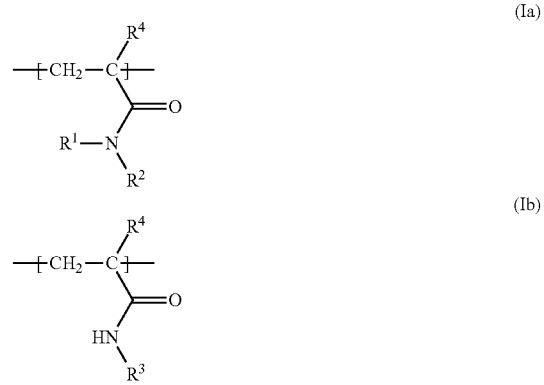

in Formulae (Ia) and (Ib), each of $R^1$, $R^2$, and $R^3$ independently represents an alkyl group optionally having a substituent, a silyl group, an amino group optionally having a substituent, a silanyl group, an alicyclic group optionally having a substituent, a heterocyclic group optionally having a substituent, or an aromatic ring group optionally having a substituent, $R^1$ and $R^2$ together with the nitrogen atom to which they are bound optionally form a ring, and each $R^4$ independently represents a hydrogen atom or a methyl group.

5. The modified acrylic block copolymer according to claim 1, wherein the polymer block (B) further comprises an N-substituted bis((meth)acryl)amide unit (e).

6. The modified acrylic block copolymer according to claim 5, wherein the N-substituted bis((meth)acryl)amide unit (e) is a unit represented by Formula (II):

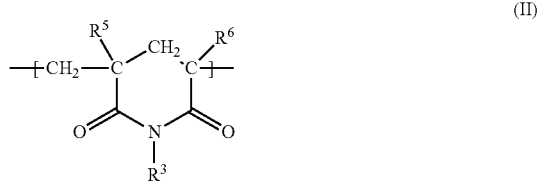

in Formula (II), each $R^3$ independently represents an alkyl group optionally having a substituent, a silyl group, an amino group optionally having a substituent, a silanyl group, an alicyclic group optionally having a substituent, a heterocyclic group optionally having a substituent, or an aromatic ring group optionally having a substituent, and each of $R^5$ and $R^6$ independently represents a hydrogen atom or a methyl group.

7. An acrylic adhesive comprising the modified acrylic block copolymer according to claim 1.

8. The acrylic adhesive according to claim 7, further comprising a tackifier resin in an amount of not less than 1 part by mass and not more than 400 parts by mass relative to 100 parts by mass of the modified acrylic block copolymer.

9. The acrylic adhesive according to claim 7, further comprising a plasticizer in an amount of not less than 1 part by mass and not more than 400 parts by mass relative to 100 parts by mass of the modified acrylic block copolymer.

10. An adhesive product comprising an adhesive layer comprising the acrylic adhesive according to claim 7.

11. A method for producing a modified acrylic block copolymer, the method comprising
subjecting a block copolymer (C) to a reaction in the presence of an amine compound, wherein the block polymer (C) comprises a polymer block (A) comprising a (meth)acrylic acid ester unit (a) and a polymer block (B') comprising a (meth)acrylic acid ester unit (b'), the (meth)acrylic acid ester unit (a) is structurally different from the (meth)acrylic acid ester unit (b'), thereby partly or entirely converting only the (meth)acrylic acid ester unit (b') into at least one selected from the group consisting of an N-substituted (meth)acrylamide unit (d), a (meth)acrylic acid unit (c), and an N-substituted bis((meth)acryl)amide unit (e), to obtain the modified acrylic block copolymer comprising the polymer block (A) and a polymer block (B), the polymer block (B) comprising the N-substituted (meth)acrylamide unit (d) and the (meth)acrylic acid unit (c), and the polymer block (B) satisfying the following relationships:

wherein
[d] is a molar amount of the N-substituted (meth)acrylamide unit (d) relative to 100 mol of total molar amount of units constituting the polymer block (B) and
[c] is a molar amount of the (meth)acrylic acid unit (c) relative to 100 mol of total molar amount of units constituting the polymer block (B).

12. The method for producing a modified acrylic block copolymer according to claim 11, wherein the converting is performed by controlling a temperature of a mixture of the block copolymer (C) and the amine compound to be not less than a softening point of the block copolymer (C).

13. The method for producing a modified acrylic block copolymer according to claim 11, wherein the amine compound is a primary amine or a secondary amine.

14. The method for producing a modified acrylic block copolymer according to claim 11, wherein the amine compound is a primary amine represented by Formula (1) or a secondary amine represented by Formula (2):

$$NH_2-R^3 \quad (1)$$

$$R^1-NH-R^2 \quad (2)$$

in Formulae (1) and (2), each of $R^1$, $R^2$ and $R^3$ independently represents an alkyl group optionally having a substituent, a silyl group, an amino group optionally having a substituent, a silanyl group, an alicyclic group optionally having a substituent, a heterocyclic group optionally having a substituent, or an aromatic ring group optionally having a substituent, and $R^1$ and $R^2$ together with the nitrogen atom to which they are bound optionally form a ring.

15. The method for producing a modified acrylic block copolymer according to claim 11, wherein the (meth)acrylic acid ester unit (a) is an alkyl (meth)acrylate unit that is not a methyl (meth)acrylate unit.

16. The method for producing a modified acrylic block copolymer according to claim 11, wherein the (meth)acrylic acid ester unit (b') is a methyl (meth)acrylate unit.

17. The method for producing a modified acrylic block copolymer according to claim 11, wherein a molar amount of the amine compound used in the reaction is 2 mol to 100 mol relative to 100 mol of the (meth)acrylic acid ester unit (b').

* * * * *